Patented July 6, 1954

2,683,146

UNITED STATES PATENT OFFICE 2,683,146

TETRAHYDROISOQUINOLINIUM DERIVATIVES AND METHODS FOR THEIR PRODUCTION

Richard A. Robinson, Morton Grove, Ill., assignor to G. D. Searle & Co., Chicago, Ill., a corporation of Illinois No Drawing. Application February 7, 1950,
Serial No. 142,941

15 Claims. (Cl. 260—286)

The present invention is concerned generally with isoquinolinium compounds, and more particularly with the 1-aralkyl-1,2,3,4-tetrahydro-2,2 - dialkyl - 6,7 - dihydroxyisoquinolinium salts which may be represented by the general formula

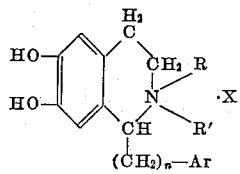

in which n is either 1 or 2, in which Ar is an aryl or substituted aryl group, R and R' are lower alkyl groups, and X is an equivalent of an anion.

Among the radicals which Ar may represent are phenyl, monohydroxyphenyl, dihydroxyphenyl, chlorophenyl, bromophenyl and the like. Among the radicals which R and R' may represent are methyl, ethyl and propyl. R and R' may be identical or different groups. X is an equivalent of an anion such as chloride, bromide, iodide, sulfate, phosphate, citrate, tartrate, ethylsulfate, methylsulfate, benzenesulfonate, toluenesulfonate, lactate and the like.

The compounds of this invention have shown highly useful therapeutic properties. Experiments on the nictitating membrane of the cat have shown that the compounds of this invention have the ability of blocking transmission of nervous impulses through the sympathetic ganglia. Thus 1-benzyl-1,2,3,4-tetrahydro-2,2-dimethyl-6,7-dihydroxy-isoquinolinium chloride is 9.6 times as active as tetraethylammonium bromide in this respect on a molar basis. A similar degree of potency may be found for this compound with respect to the blocking of parasympathomimetic impulses through ganglia to the urinary bladder of the dog.

The compounds of this invention can be produced by reacting a 3,4-dialkoxyphenethylamine with an arylalkanoic acid of the formula Ar—(CH$_2$)$_n$—COOH and treating the resulting amide with phosphorous oxychloride. There is thus formed a 1-aralkyl - 6,7 - dialkoxy - 3,4 - dihydroisoquinoline which can be reduced to the corresponding 1,2,3,4-tetrahydroquinoline derivative by catalytic methods employing a noble metal catalyst, such as platinum oxide or palladium black, or a nickel catalyst, such as Raney nickel. The reduction of the dihydroisoquinoline derivative to the corresponding tetrahydro compound can also be done chemically, as with zinc and acid. The tetrahydroquinoline derivative is then quaternized by reaction with an alkyl halide, sulfate or aryl-sulfonate, and then the alkoxy groups in the 6 and 7 positions are cleaved with hydrobromic acid or hydriodic acid. Alternatively, the dihydroquinoline derivative may be quaternized before reduction. After reduction the amino group is again treated with an alkyl halide, sulfate or arylsulfonate to requaternize the amino group. During the cleavage of the alkoxyl groups in the tetrahydroisoquinoline nucleus to hydroxyl groups, other alkoxyl groups in the aryl radical, Ar, are likewise converted to hydroxyl groups.

The examples below illustrate in detail methods by which these 1-aralkyl-1,2,3,4-tetrahydro-2,2 - dialkyl - 6,7 - dihydroxyisoquinolinium salts may be prepared and some of their properties. This invention is not to be construed as limited thereby in spirit or in scope. It will be apparent to all skilled in the art that many modifications in materials and methods may be made without departing from the invention.

EXAMPLE 1

*1-benzyl-3,4-dihydro-6,7-dimethoxyisoquinoline*

23 g. of homoveratrylamine are mixed in presence of 10 ml. benzene with 20 g. of phenylacetic acid and heated in an open flask at 200°±10° C. for two hours.

The precipitate is washed on a filter with benzene and then with ether, yielding 38 g. of N-phenacetyl-homoveratrylamine. After recrystallization from benzene, white crystals of a melting point of 110° C. are obtained. 23 g. of this amide are heated at reflux temperature for 2 hours with 60 ml. of phosphorus oxychloride and 120 ml. of toluene. After evaporation in vacuo the residue is dissolved in alcohol and rendered alkaline by the slow addition of saturated sodium hydroxide solution. The 1-benzyl-3,4-dihydro-6,7-dimethoxyisoquinoline is extracted by ether and converted to the hydrochloride, 22 g. of cream colored crystals being obtained, melting at 176° C. (with decomposition).

EXAMPLE 2

*1-benzyl-1,2,3,4-tetrahydro-6,7-dimethoxy-isoquinoline*

16 g. of the hydrochloride obtained in Example 1 are hydrogenated in presence of 0.1 g. of platinum oxide and 200 ml. of methanol at room temperature for 20 minutes or until absorption ceases. The catalyst is removed by filtration and the filtrate alkylated directly as in Example 3.

EXAMPLE 3

*1-benzyl-1,2,3,4-tetrahydro-2,2-dimethyl-6,7-dimethoxyisoquinolinium iodide*

The methanol filtrate, obtained as in Example 2, containing 68 g. of the hydrochloride in about 1 liter of methanol, is diluted with 200 ml. of water and boiled overnight at gentle reflux temperature with 70 g. of anhydrous potassium carbonate and 105 g. of methyl iodide. The solution is then evaporated in an open dish until crystallization commences. Upon cooling, 78 g. of white crystals separate. They are washed with water, then with ether and air dried. Recrystallization from ethanol yields white crystals, melting at 222° C.

EXAMPLE 4

*1-benzyl-2-methyl-3,4-dihydro-6,7-dimethoxy-isoquinolinium bromide*

316 g. of N-phenacetyl-homoveratrylamine are converted with 950 ml. phosphorus oxychloride in 2 liters of toluene to 1-benzyl-3,4-dihydro-6,7-dimethoxyisoquinoline as in Example 1, and the product heated to 70–80° C. for two hours with 100 g. of methyl bromide and 500 ml. of 2-butanone. One purifies by washing with 2-butanone, and obtains a yield of 296 g. of white crystals.

EXAMPLE 5

*1-benzyl-2-methyl - 1,2,3,4 - tetrahydro - 6,7 - dimethoxyisoquinoline*

296 g. of the product obtained in Example 4 are reduced with platinum oxide and hydrogen in methanol as in Example 2 to obtain a 90% yield of the hydrobromide melting at 205–206° C. after recrystallization from methanol.

EXAMPLE 6

*1-benzyl-1,2,3,4-tetrahydro-2,2-dimethyl-6,7-dimethoxyisoquinolinium bromide*

175 g. of the hydrobromide obtained as in Example 5, are treated with warm dilute sodium hydroxide, and the base is extracted with four 400 ml. portions of benzene. The benzene is removed by vacuum distillation and the residue treated with methyl bromide in 2-butanone. The reaction occurs at once. The quaternary salt precipitates before the methyl bromide addition is completed. The crystals are filtered and washed with 2-butanone. The filtrate is then treated with an additional quantity of methyl bromide and a total yield of 177 g. of the bromide is obtained. The melting point of 229° C. is the same as that obtained by conversion of the iodide of Example 3 to bromide.

EXAMPLE 7

*1-benzyl-1,2,3,4-tetrahydro-2,2-dimethyl-6,7-dihydroxyisoquinolinium salts*

135 g. of the bromide of Example 6 are heated to reflux temperature with 350 ml. of 48% hydrogen bromide for 12 hours. The evolution of methyl bromide is rapid in the beginning. The aqueous hydrobromic acid is distilled off at 25 mm. pressure. The residue is washed with ethanol to yield white crystals melting at 207° C. To convert this bromide into the chloride one may treat it with silver chloride in dry methanol solution, a product melting at 202° C. being obtained. One washes with isopropanol or ethanol containing a little hydrogen chloride for purification. The bromide may be diluted in water and the difficultly soluble iodide precipitates by addition of potassium iodide. Upon recrystallization from water white needles are obtained, which melt at 220° C. To prepare the citrate one treats a solution of three moles of the bromide with one mole of silver citrate and two moles of citric acid.

EXAMPLE 8

*1-benzyl-1,2,3,4-tetrahydro -2- methyl - 2 - ethyl-6,7-dimethoxyisoquinolinium bromide*

72 g. of free 1-benzyl-2-methyl-1,2,3,4-tetrahydro-6,7-dimethoxyisoquinoline, obtained as in Example 6, are placed into a citrate bottle with 100 ml. of 2-butanone and 25 ml. of ethyl bromide and heated for 12 hours at 70–80° C. The quaternary ammonium salt precipitates in an oily state. On treatment with anhydrous ether the substance solidifies. Filtration, washing with ether and drying in an oven at 70° C. yields 95 g. of 1-benzyl-1,2,3,4-tetrahydro-2-methyl-2-ethyl - 6,7 - dimethoxyisoquinolinium bromide, melting at 90–110° C.

EXAMPLE 9

*1-benzyl-1,2,3,4-tetrahydro -2- methyl - 2 - ethyl-6,7-dihydroxyisoquinolinium salts*

The dimethyl ether described in Example 8 is dissolved in 280 ml. of 48% hydrobromic acid and heated under reflux to boiling for 18 hours. The mass is distilled to dryness at 25–30 mm. pressure and 90–100° C. and then diluted with water. The bromide crystallizes on standing, 72 g. being thus obtained. It may be converted to the chloride by silver chloride in methanol. One evaporates and washes with 2-butanone and finally with ethanol to obtain white crystals, melting at 183° C. The bromide may be treated with water and sodium iodide to precipitate the iodide, which after washing with water and then with isopropanol melts at 205° C.

EXAMPLE 10

*1-benzyl-1,2,3,4-tetrahydro-2-methyl -2- propyl -6,7-dihydroxyisoquinolinium bromide*

1-benzyl-2-methyl-1,2,3,4-tetrahydro - 6,7 - dimethoxyisoquinoline is treated with propyl bromide by the method described in Example 8. The yield is improved by treatment of the filtrate with additional quantities of propyl bromide. The 1-benzyl -1,2,3,4- tetrahydro - 2 - methyl - 2 - propyl-6,7-dimethoxyisoquinolinium bromide is boiled under reflux with 48% hydrobromic acid for 10 hours, the aqueous acid removed by vacuum distillation and the residue washed with ethanol to prepare the white crystalline bromide. Other salts are obtained by the methods indicated in Examples 7 and 9.

EXAMPLE 11

*1-benzyl-1,2,3,4-tetrahydro-2-ethyl -6,7- dimethoxyisoquinoline*

23 ml. of ethyl sulfate are added to a mixture of 38 g. of 1-benzyl-1,2,3,4-tetrahydro-6,7-dimethoxyisoquinoline, prepared as in Example 2, and an aqueous solution of 17 g. of potassium hydroxide. The ethylation is completed in about one hour. The heating is continued for 30 minutes with vigorous agitation. The mixture is cooled and the organic bases are extracted thoroughly with ether. 36 g. of the oily base are obtained.

EXAMPLE 12

*1-benzyl-1,2,3,4-tetrahydro-2,2 - diethyl - 6,7 - dimethoxyisoquinolinium iodide*

26 g. of the oily base, obtained as in Example 11, are heated to reflux temperature with 20 ml.

of ethyl iodide and 100 ml. of nitromethane for 3 hours. After vacuum distillation a residue is obtained which crystallizes. Washing with anhydrous ether, isopropanol and 2-butanone yields 29 g. of yellowish white crystals.

EXAMPLE 13

*1-benzyl-1,2,3,4-tetrahydro-2,2-diethyl-6,7-dihydroxyisoquinolinium salts*

29 g. of the iodide of the dimethyl ether described in Example 12 and 100 ml. of 48% hydrobromic acid are heated to reflux temperature for 7 hours. The mass is cooled, diluted with 500 ml. of water and salted out with sodium iodide. The iodide crystallizes on standing and cooling. Crystals melting at 150° C. are obtained on recrystallization from nitromethane, washing with ethyl acetate and finally with water.

EXAMPLE 14

*1-(p-anisyl)-1,2,3,4-tetrahydro-6,7-dimethoxyisoquinoline*

20 g. of homoveratrylamine are heated with 18 g. of homoanisic acid in an open vessel at 190–200° C. for 2 hours. One crystallizes the resulting N-(p-methoxy)-phenacetyl-homoveratrylamine from benzene, washes with benzene and ether and dries at 70° C. The 34 g. thus obtained are heated at reflux temperature with 105 ml. of phosphorus oxychloride and 200 ml. of toluene. Vacuum distillation at 25 mm. pressure leaves a crystalline residue which is dissolved in 150–200 ml. of ethanol. The alcoholic solution of the phosphate is then treated slowly with an excess of aqueous potassium hydroxide and finally diluted to one liter with water. Most of the 1-(p-anisyl)-3,4-dihydro-6,7-dimethoxyquinoline may be removed by filtration. The filtrate is extracted twice with ether, the organic base extracted from the ether solution by means of dilute hydrochloric acid and the acid extract is added to the main portion of the product and reduced at the boiling point with 18 g. of zinc dust for 3.5 hours. The product crystallizes as white needles on standing overnight. The entire mixture is made strongly alkaline with sodium hydroxide and extracted with benzene and then once with ether. The benzene-ether solution is dried over potassium hydroxide pellets and the 1-(p-anisyl)-1,2,3,4-tetrahydro-6,7-dimethoxyisoquinoline precipitated as the hydrochloride on addition of hydrogen chloride in isopropanol. Filtration and washing with isopropanol and finally with ether yield 28 g. of white crystals, which melt at 191–193° C.

EXAMPLE 15

*1-(p-anisyl)-1,2,3,4-tetrahydro-2,2-dimethyl-6,7-dimethoxyisoquinolinium iodide*

28 g. of the hydrochloride obtained in Example 14 is heated with a saturated solution of 12 g. of potassium hydroxide, 10 g. of sodium acetate, 400 ml. of methanol and 17 ml. of methyl iodide to reflux temperature for 5 hours. The mixture is diluted with water and heated on a steam bath until all the alcohol is expelled. The product is oily and crystallizes on shaking with dilute sodium bicarbonate and ether. The crystals are washed with water and ether, and after drying at 70° C., 16 g. of the desired iodide are obtained.

EXAMPLE 16

*1-(p-hydroxybenzyl)-1,2,3,4-tetrahydro-2,2-dimethyl-6,7-dihydroxyisoquinolinium salts*

14 g. of the iodide of the trimethyl ether, obtained as in Example 15, are heated with 100 ml. of 48% hydrobromic acid at gentle reflux temperature for 15 hours. After vacuum distillation the residue is treated with a mixture of benzene and alcohol. The crystalline product is washed on a filter with hot methanol. The yellowish, crystalline substance melts at 234° C. The iodide is converted to the chloride as in previous examples. White crystals, melting at 214° C., are obtained.

EXAMPLE 17

*1-(3',4'-dimethoxybenzyl)-1,2,3,4-tetrahydro-2,2-dimethyl-6,7-dimethoxyisoquinolinium iodide*

18.1 g. of veratrylamine are reacted with 19.6 g. of homoveratric acid at 180–190° C. for one hour in an open container. The resulting N-(3,4-dimethoxy)-phenacetyl homoveratrylamine is crystallized in presence of benzene. It is filtered, washed with several 10-ml. portions of benzene and one 50-ml. portion of ether. The white crystals melt at 122° C. 32 g. of this amide are heated with 75 ml. of phosphorus oxychloride and 150 ml. of toluene at reflux temperature for 1.5 hours. The 1-(3',4'-dimethoxybenzyl)-3,4-dihydro-6,7-dimethoxyisoquinoline is converted to the hydrochloride by the usual method and reduced without further purification. 23 g. of this hydrochloride are hydrogenated in presence of 0.1 g. of platinum oxide, 200 ml. of methanol and 15 ml. of water at room temperature in a Parr apparatus at approximately 35 pounds' pressure in the course of two hours. The catalyst is removed by filtration and the filtrate alkylated using 20 ml. of methyl iodide, 9 g. of potassium carbonate pellets dissolved in water, and 10 g. of the trihydrate of sodium acetate. One refluxes overnight, evaporates on the steam bath and washes the crystalline residue with water, dilute potassium carbonate and ether. A 21 g. yield of yellowish crystals is obtained.

EXAMPLE 18

*1-(3',4'-dihydroxybenzyl)-1,2,3,4-tetrahydro-2,2-dimethyl-6,7-dihydroxyisoquinolinium salts*

21 g. of the iodide of the tetramethyl ether, described in Example 17, are demethylated by heating with 70 ml. of 48% hydrobromic acid at reflux temperature for 3 hours. After vacuum distillation at 25 mm. pressure the residue is treated several times with a mixture of ethanol and benzene and evaporated under vacuum each time to remove water and hydrobromic acid. After washing with isopropanol and drying at 70° C., 18 g. of yellow white crystals are obtained. This iodide is converted to other salts by the usual methods, such as in Examples 7 and 9. The chloride forms white crystals, melting at 120–125° C.

EXAMPLE 19

*1-phenethyl-1,2,3,4-tetrahydro-6,7-dimethoxyisoquinoline*

33 g. of homoveratrylamine are mixed in the presence of 15 ml. of benzene with 30 g. of hydrocinnamic acid and heated at about 200° C. in an open container for two hours. The precipitate is filtered, washed with benzene and then with ether, to obtain the white, crystalline N-(γ-phenylpropionyl)-homoveratrylamine. 30 g. of this amide are heated at reflux temperature for 2 hours with 75 ml. of phosphorus oxychloride and 230 ml. of toluene. After distillation in vacuo the residue is dissolved in ethanol and made alkaline by addition of a saturated solution of sodium hydroxide. The 1-phenethyl-3,4-dihydro-6,7-dimethoxyisoquinoline is extracted with ether. It is converted to the hydrochloride by the usual method and reduced without further purification in the presence of 0.1 g. of platinum oxide and 200 ml. of methanol at room temperature until hydrogen absorption ceases. The catalyst is removed by filtration and the filtrate alkylated directly.

EXAMPLE 20

*1-phenethyl-1,2,3,4-tetrahydro-2,2-dimethyl-6,7-dimethoxy-isoquinolinium iodide*

The methanol filtrate, obtained in Example 19, containing 45 g. of the hydrochloride in about 600 ml. of methanol is diluted with 150 ml. of water and boiled at reflux temperature with 48 g. of anhydrous potassium carbonate and 50 g. of methyl iodide. The solution is evaporated until crystallization is observed. On cooling, white crystals separate which are washed with ether and air dried.

EXAMPLE 21

*1-phenethyl-1,2,3,4-tetrahydro-2,2-dimethyl-6,7-dihydroxy-isoquinolinium iodide*

The dimethyl ether obtained in Example 20, is demethylated by heating to reflux temperature with an excess of 48% hydrogen bromide for 10 hours. The evolution of methyl bromide, vigorous in the beginning, gradually becomes slower. The aqueous hydrobromic acid is distilled off at 25 mm. pressure and the residue washed with ethanol to produce white crystals of the iodide. Other salts are obtained in the usual manner.

I claim:

1. A 1 - aralkyl-1,2,3,4-tetrahydro-2,2-dialkyl-6,7-dihydroxyisoquinolinium salt having the general structural formula

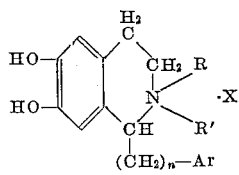

wherein $n$ is an integer greater than zero and smaller than 3, wherein Ar is a member of the class consisting of phenyl and hydroxy-substituted phenyl groups, wherein R and R' are lower alkyl groups and wherein X is a non-toxic anion.

2. A 1 - phenylalkyl - 1,2,3,4-tetrahydro-2,2-dialkyl - 6,7 - dihydroxyisoquinolinium salt having the general structural formula

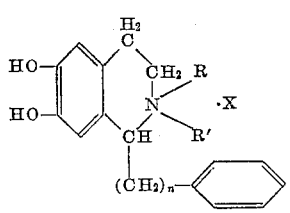

wherein $n$ is an integer greater than zero and smaller than three, wherein R and R' are alkyl groups containing no more than three carbon atoms, and wherein X is a non-toxic anion.

3. A 1 - phenylalkyl - 1,2,3,4-tetrahydro-2,2-dialkyl-6,7-dihydroxyisoquinolinium salt having the general structural formula

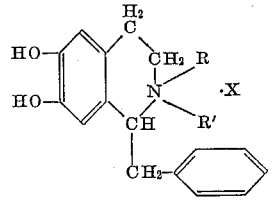

wherein R and R' are alkyl groups containing no more than three carbon atoms, and wherein X is a non-toxic anion.

4. A 1 - benzyl - 1,2,3,4-tetrahydro-2-methyl-2-alkyl-6,7-dihydroxyisoquinolinium salt having the formula

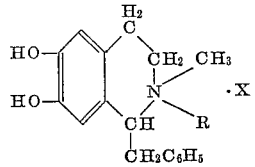

wherein R is an alkyl group containing not more than three carbon atoms and X is a non-toxic anion.

5. A non-toxic 1-benzyl-1,2,3,4-tetrahydro-2,2-dimethyl-6,7-dihydroxyisoquinolinium salt.

6. A 1-benzyl-1,2,3,4-tetrahydro-2,2-dimethyl-6,7-dihydroxyisoquinolinium halide.

7. A non-toxic 1-benzyl-1,2,3,4-tetrahydro-2-methyl-2-ethyl-6,7-dihydroxyisoquinolinium salt.

8. A 1-benzyl-1,2,3,4 - tetrahydro-2-methyl-2-ethyl-6,7-dihydroxyisoquinolinium halide.

9. A non-toxic 1-benzyl-1,2,3,4-tetrahydro-2,2-diethyl-6,7-dihydroxyisoquinolinium salt.

10. A 1-benzyl-1,2,3,4-tetrahydro-2,2-diethyl-6,7-dihydroxyisoquinolinium halide.

11. A hydroxy substituted 1-phenylalkyl-1,2,3,4-tetrahydro-2,2-dialkyl-6,7,-dihydroxyisoquinolinium salt having the structural formula

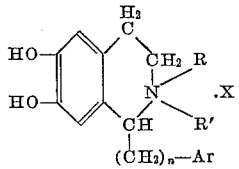

wherein $n$ is an integer greater than zero and smaller than 3, Ar is a hydroxy-substituted phenyl group, R and R' are lower alkyl groups and X is a non-toxic anion.

12. A hydroxy substituted 1-benzyl-1,2,3,4-tetrahydro-2,2-dialkyl - 6,7 - dihydroxyisoquinolinium salt having the structural formula

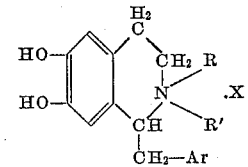

wherein Ar is a hydroxy substituted phenyl group, R and R' are lower alkyl groups and X is a non-toxic anion.

13. A 1-(hydroxybenzyl) - 1,2,3,4 - tetrahydro- 2,2-dimethyl-6,7-dihydroxyisoquinolinium salt of the structural formula

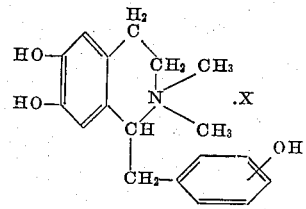

wherein X is a non-toxic anion.

14. A 1-(p-hydroxybenzyl)-1,2,3,4-tetrahydro-2,2-dimethyl-6,7-dihydroxyisoquinolinium halide.

15. A non-toxic 1-(3',4'-dihydroxybenzyl)-1,2,3,4-tetrahydro-2,2-dimethyl-6,7-dihydroxyisoquinolinium salt.

References Cited in the file of this patent

UNITED STATES PATENTS

| Number | Name | Date |
|---|---|---|
| 2,223,373 | Kulz et al. | Dec. 3, 1940 |

FOREIGN PATENTS

| Number | Country | Date |
|---|---|---|
| 868,733 | France | Oct. 20, 1941 |

OTHER REFERENCES

Fieser et al.: "Organic Chemistry" (D. C. Heath and Co., Boston, 1944), page 32.

Hjort et al.: J. Pharmacology, vol. 76, pp. 64-74 (1942).

Schopf et al.: Annalen, vol. 497, pp. 47-48 (1932).

Craig et al.: J. Am. Chem. Soc., vol. 70, pp. 2783-5 (1948).